United States Patent
Stievater et al.

(10) Patent No.: US 7,673,517 B2
(45) Date of Patent: Mar. 9, 2010

(54) SYSTEM AND METHOD FOR OPTICAL INTERROGATION OF MICRO-MECHANICAL SENSORS USING MICROCAVITY INTERFEROMETRY

(75) Inventors: Todd H. Stievater, Arlington, VA (US); William S Rabinovich, Silver Spring, MD (US); Eric J Houser, Ocean View, NJ (US); Stanley V. Stepnowski, Alexandria, VA (US); R Andrew McGill, Lorton, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 534 days.

(21) Appl. No.: 11/559,119

(22) Filed: Nov. 13, 2006

(65) Prior Publication Data
US 2007/0125150 A1    Jun. 7, 2007

Related U.S. Application Data

(60) Provisional application No. 60/735,997, filed on Nov. 10, 2005.

(51) Int. Cl.
*G01N 29/00* (2006.01)
(52) U.S. Cl. .............................. 73/653; 73/655; 73/657
(58) Field of Classification Search .................. 73/653, 73/654, 655, 657; 422/82.01, 68.01, 98; 204/400, 403.06, 403.1
See application file for complete search history.

(56) References Cited

U.S. PATENT DOCUMENTS

| | | | | |
|---|---|---|---|---|
| 2,993,876 A | * | 7/1961 | Mcglamery | 428/397 |
| 4,454,522 A | * | 6/1984 | de Lozanne | 257/36 |
| 5,520,862 A | * | 5/1996 | Face et al. | 264/40.1 |
| 5,811,815 A | * | 9/1998 | Marshall et al. | 250/370.06 |
| 6,157,404 A | * | 12/2000 | Marshall et al. | 348/216.1 |
| 6,289,717 B1 | | 9/2001 | Thundat et al. | |
| 6,710,355 B2 | * | 3/2004 | Youngner | 250/458.1 |
| 7,062,110 B2 | * | 6/2006 | Freeman et al. | 385/12 |
| 7,112,760 B2 | * | 9/2006 | Ishikawa et al. | 219/121.76 |
| 7,344,678 B2 | | 3/2008 | Majumdar et al. | |

(Continued)

OTHER PUBLICATIONS

MEMS Chemical Sensors Using Waveguide Fabry-Perot Microcavities (Marcel W. Pruesner et al.) IEEE, 2008.*

(Continued)

*Primary Examiner*—J M Saint Surin
(74) *Attorney, Agent, or Firm*—John J. Karasek; Sally A Ferrett (57) ABSTRACT

A sensor and a method for sensing a change in mass of a reflective microbeam in a sensor, the sensor having a reflective layer disposed on a substrate and spaced apart from the reflective microbeam. The microbeam receives amplitude modulated laser energy at a first wavelength and is photothermally excited into resonance at the frequency of amplitude modulation, the reflective microbridge and the reflective layer receive optical energy at a second wavelength and reflect the optical energy toward a receiver. A change in reflectivity of the microbeam at different frequencies is determined. A change in reflectivity indicates a change in resonant frequency of the microbeam. Mass of the microbeam changes when a chemoselective material on the microbeam sorbs a target chemical.

36 Claims, 7 Drawing Sheets

U.S. PATENT DOCUMENTS

2008/0035846 A1* 2/2008 Talghader et al. ........ 250/338.1

OTHER PUBLICATIONS

Adams, J.D., Parrott, G., Bauer, C., Sant, T., Manning, L., Jones, M. and Rogers, B., "Nanowatt chemical vapor deposition with a self-cleansing, piezoelectric microcantilever array", Appl. Phys. Lett., vol. 83, No. 16, pp. 3428-3430, Oct. 2003.

Bubb, D. M., Mcgill, R. A., Horwitz, J. S., et al., "Laser-based processing of polymer nanocomposites for chemical sensing applications", Journal of Applied Physics, vol. 89, No. 10, pp. 5739-5739-46, May 2001.

Carr, D. W., Craighead, H. G., "Fabrication of nanoelectromechanical systems in single crystal silicon using silicon on insulator substrates and electron beam lithography", J. Vac. Sci. Technol. B, vol. 15, No. 6, pp. 2760-2763, Nov./Dec. 1997.

Cornila, C., Hierlemann, A., Lenggenhager, R., et al., "Capacitive sensors in CMOS technology with polymer coating", Sensors and Actuators B, vol. 24-25, pp. 357-361, 1995.

Goetz, P.G., Mahon, R., Stievater, T.H., Rabinovich,W.S., Binari S.C., "High-speed large-area surface-normal multiple quantum well modulators" SPIE vol. 5160, pp. 346-354, 2004, (conference date Aug. 4, 2003).

Hansen, K.M., Thundat, T., "Microcantilever biosensors", Methods: A Companion to Methods in Enzymology, vol. 37, No. 1, pp. 57-64, Sep. 2005.

Hu, Z., Seeley, T., Kosset, S., Thundat, T., "Calibration of optical cantilever deflection readers", Rev. Sci. Instrum., vol. 75, No. 2, pp. 400-404, Feb. 2004.

Lavrik, n. V., Datskos, P.G. "Femtogram mass detection using photothermally actuated nanomechanical resonators", Applied Physics Letters, vol. 82, No. 16, pp. 2697-2699, Apr. 2003.

Meyer, G., Amer, N.M., "Novel optical approach to atomic force microscopy", Appl. Phys. Lett., vol. 53, No. 12, Sep. 1988, pp. 1045-1047.

Ngoi, B.K.A., Venkatakrishnan, K., Tan, B., "Laser scanning heterodyne-interferometer for micro-components", Optical Communications, vol. 173, pp. 291-301, Jan. 2000.

Savran C.A., Sparks A.W., Sihler, J., et al., "Fabrication and characterization of a micromechanical sensor for differential detection of nanoscale motions", J. Microelectromechanical Systems, vol. 11, No. 6, Dec. 2002, pp. 703-708.

Scholl, D., Everson, M.P., Jaklevic, R.C., "In situ force calibration of high force constant atomic force microscope cantilevers", Rev. Sci. Instrum., vol. 65, No. 7, pp. 2255-2257, Jul. 1994.

Stievater, T.H., Rabinovich, W.S., Newman, H.S., Ebel, J.L., Mahon, R., McGee, D.J., Goetz, P.G., "Microcavity Interferometry for MEMS Device Characterization," Journal of Microelectromechanical Systems, vol. 12, Issue 1, p. 109-116(2003).

Stievater, T. H., Rabinovich, W. S., Ferraro, M. S., Papanicolaou, N. A., Boos, J. B., McGill, R. A., Stepnowski, J. L., Houser, E. J., "All-Optical Micromechanical Chemical Sensors," Applied Physics Letters, vol. 89, Issue 9, p. 091125-1-091125-3, (Sep. 2006).

Stievater T.H., Rabinovich W.S., Newman, H.S., et al., "Measurement of thermal-mechanical noise in microelectromechanical systems", Appl. Phys. Lett., vol. 81, No. 10, p. 1779-1781, Sep. 2002.

Thundat, T., Wachter, E. A., Sharp, S. L., Warmack, R., "Detection of mercury vapor using resonating microcantilevers", Appl. Phys. Lett. vol. 66, No. 13, pp. 1695-1697, Mar. 1995.

Thundat, T., Sharp, S.L., Fisher, W.G., Warmack, R.J., Wachter, E.A., "Micromechanical radiation dosimeter", Appl. Phys. Lett., vol. 66, No. 12, pp. 1563-1565, Mar. 1995.

Tortonese, M., Barrett, R.C., Quate, C.F., "Atomic resolution with an atomic force microscope using piezoresistive detection", Appl. Phys. Lett., vol. 62, No. 8, pp. 834-836, Feb. 1993.

Vignola, J.F., Liu, X., Morse, S.F., "Characterization of silicon micro-oscillators by scanning laser vibrometry", Rev. Sci. Instrum., vol. 73, No. 10, pp. 3584-3588, Oct. 2002.

Wachter, E.A., Thundat, T., Oden. P.I., Warmack, R.J., Datskos, P.G., Sharp, S.L., "Remote optical detection using microcantilevers", Rev. Sci. Instrum., vol. 67, No. 10, pp. 3434-3439, Oct. 1996.

Wachter, E.A., Thundat, T., "Micromechanical sensors for chemical and physical measurements", Rev. Sci. Instrum., vol. 66, No. 6, pp. 3662-3667, Jun. 1995.

Howe, R.T., and R. S. Muller, "Resonant-microbridge vapor sensor", IEEE Trans. Electron Devices vol. 33, p. 499-506, (1986).

Pinnaduwage, L. A., V. Boiadjiev, J. E. Hawk, and T. Thundat, "Sensitive detection of plastic explosives witih self-assembled monolayer-coated microcantilevers", Appl. Phys. Lett., vol. 83, p. 1471-1473 (Aug. 2003).

Fritz, J., M. K. Baller, H. P. Lang, H. Rothuizen, P. Vettiger, E. Meyer, H.J. Güntherodt, C. Gerber, and J. K. Gimzewski, "Translating Biomolecular Recognition into Nanomechanics", Science, vol. 288, p. 316-318, (Apr. 2000).

Hagleitner, C., D. Lange, A. Hierlemann, O. Brand, and H. Baltes, "CMOS single-chip gas detection system comprising capacitive, calorimetric and mass-sensitive microsensors", IEEE J. Solid-State Circuits, vol. 37, p. 1867-1878, (Dec. 2002).

* cited by examiner

SYSTEM AND METHOD FOR OPTICAL INTERROGATION OF MICRO-MECHANICAL SENSORS USING MICROCAVITY INTERFEROMETRY

CROSS-REFERENCE TO RELATED APPLICATIONS

This Application is a nonprovisional of provisional (35 USC 119(e)) application 60/735,997 filed on Nov. 10, 2005, the entire disclosure of which is incorporated by reference herein.

BACKGROUND

Many microelectromechanical systems (MEMSs) have enabled coated microcantilevers and microbeams to be used as sensors.

One example of a MEMs based sensor is described in T. Thundat, E. A. Wachter, S. L. Sharp, and R. Warmack, Appl. Phys. Lett. 66, 1695 (1995). Another example is described in T. Thundat et al., "Micromechanical radiation dosimeter", Appl. Phys. Lett., Vol. 66, Issue 12, March 1995, pages 1563-1565. E. A. Wacheter et al. describe measurement of resonance frequency and static bending of a microcantilever in "Micromechanical sensors for chemical and physical measurements", Rev. Sci. Instrum., Vol. 66, Issue 6, June 1995, pages 3662-3667.

Another example is described in E. A. Wachter et al., "Remote Optical Detection using Microcantilevers", Rev. Sci Instrum., Vol. 67, Issue 10, pages 3434-3439, October 1996. Another example is described in R. T. Howe and R. S. Muller, IEEE Trans. Electron Devices 33, 499, (1986). L. A. Pinnaduwage, V. Boiadjiev, J. E. Hawk, and T. Thundat, Appl. Phys. Lett. 83, 1471 (2003) describes chemical vapor detection at a level of 30 parts per trillion. Fritz, M. K. Baller, H. P. Lang, H. Rothuizen, P. Vettiger, E. Meyer, H. J. Güntherodt, C. Gerber, and J. K. Gimzewski, Science 288, 316 (2000) describes detection of single DNA base pairs. In another example, N. V. Lavrik and P. G. Datskos, Appl. Phys. Lett. 82, 2697 (2003) describes detection at the level of 6 femtograms using photothermal actuation and interferometric readout of microcantilever resonators.

Optical interferometry is used to detect differential and absolute deflections of two adjacent cantilevers in C. A. Savran, "Fabrication and Characterization of a Micromechanical Sensor for Differential Detection of Nanoscale Motions", J. Micromechanical Systems, Vol. 11, No. 6, December 2002, pages 703-708.

A scanning laser doppler vibrometer suitable for microcomponents is described in B. K. A. Ngoi et al., "Laser scanning heterodyne-interferometer for micro-components", Optics Communications, Vol. 173, pages 291-301, January 2000.

J. F. Vignola et al. describe MEMS oscillators in "Characterization of silicon micro-oscillators by scanning laser vibrometry", Review of Scientific Instruments, Vol. 73, No. 10, October 2002, pages 3584-3588.

Attention is also drawn to G. Meyer et al., "Novel optical approach to atomic force microscopy", Appl. Phys Lett., Vol. 53, No. 12, September 1988, pages 1045-1047 for discussion of a position sensitive detector for measuring displacement of a cantilever beam.

C. Cornilla et al. describe an integrated capacitive chemical sensor in "Capacitive sensors in CMOS technology with polymer coating", Sensors and Actuators B, Vol. 24-25, pages 357-361 (1995). Microcantilever biosensors are described in K. M. Hansen et al., "Microcantilever biosensors", Methods, Vol. 37, Issue 1, pages 57-64, 2005.

A chemical sensor using microcantilevers is described in J. D. Adams et al., "Nanowatt chemical vapor detection with a self sensing, piezoelectric microcantilever array. Another chemical sensor using microcantilevers is described in commonly assigned U.S. patent application Ser. No. 11/136,763, entitled "Microelectro-mechanical chemical sensor", filed May 25, 2005, with inventors Robert Andrew McGill, Gary K Fedder, and Ioana Voiculescu.

Optical measurement of noise from MEMs structures is described in T. H. Stievater et al., "Measurement of thermal-mechanical noise in microelectromechanical systems", Applied Physics Letters, Vol. 81, No. 10, pages 1779-1781, Sep. 2002. Microcavity interferometric measurement of an electrostatically actuated microcantilever is described in T. H. Stievater, W. S. Rabinovich, H. S. Newman, J. L. Ebel, R. Mahon, D. J. McGee, and P. G. Goetz, J. Microelectromech. Syst. 12, 109 (2003).

BRIEF SUMMARY

A method for sensing a change in mass of a reflective microbeam in a sensor, the sensor having a reflective layer disposed on a substrate and spaced apart from the reflective microbeam. The method includes the microbeam receiving amplitude modulated laser energy at a first wavelength and being photothermally excited into resonance at the frequency of amplitude modulation, the reflective microbridge and the reflective layer receiving optical energy at a second wavelength, said reflective microbeam and reflective layer reflecting the optical energy toward a receiver, and interferometrically determining a change in reflectivity of the microbeam, said change in reflectivity indicating a change in resonant frequency of the microbeam.

In some embodiments, the method also includes an amplitude modulated laser generating optical energy at the first wavelength. The method according to claim 1, wherein the frequency of amplitude modulation of the first laser is offset from the fundamental resonance frequency of the microbeam. The frequency of amplitude modulation can be varied through a frequency range that includes the resonance frequency of the microbeam without sorbed chemical in a chemoselective layer on the microbeam and the resonance frequency of the microbeam with sorbed chemical in a chemoselective layer on the microbeam.

A tunable laser can be used to generate optical energy at the second wavelength. The second wavelength can be tuned to a side of the Fabry-Perot mode of the etalon cavity, the etalon cavity being formed by the reflective microbeam and the reflective layer disposed on the substrate.

In some embodiments, a layer of chemoselective material is disposed on the microbeam. The layer of chemoselective material is disposed on a surface of the microbeam opposite the surface of the microbeam that faces the substrate, and can be a chemoselective polymer, including polyisobutylene. A change of resonant frequency indicates an amount of a target chemical sorbed by the chemoselective material.

In some embodiments, the substrate is transparent at the first and second wavelengths. In some embodiments, the microbeam is a microbridge spaced apart from the reflective layer by supports on both ends of the microbridge. The reflective microbeam can have a reflectivity at least as high as the reflectivity of the reflective layer disposed on the microbeam. The substrate can be sapphire.

An embodiment of the invention is directed to a mass sensor that includes a first reflective layer disposed on a transparent substrate; a microbridge including reflective material; a chemoselective material on the microbridge; and support posts arranged at each end of the microbridge to maintain the microbridge at a distance from the first reflective layer; the microbridge having a fundamental resonance frequency; the microbridge and the first reflective layer forming a Fabry-Perot etalon cavity. A change of resonant frequency of the microbeam indicates an amount of a target chemical sorbed by the chemoselective material. The chemoselective material can be a chemoselective polymer such as polyisobutylene.

In another embodiment, a mass sensor system also includes an amplitude modulated laser for photothermally exciting the microbridge at its fundamental resonance frequency, a tunable laser for optically interrogating the etalon cavity, and a receiver operative to receive reflections from the etalon cavity. The receiver, the amplitude modulated laser, and the tunable laser are part of a common assembly remote from the mass sensor. The sensor can also include a retroreflector.

Another embodiment of the invention is directed to a method for forming an optically interrogated and photothermally excited mass sensor. The method includes depositing a first reflective layer on a transparent substrate, forming support posts on the first reflective layer with a sacrificial material between the support posts, depositing reflective material on the supports posts and the sacrifical material to form a microbridge, dissolving the sacrificial material, and depositing a chemoselective material on the microbridge.

Further details will be apparent from reviewing the following drawings and description.

DETAILED DESCRIPTION OF EMBODIMENTS OF THE INVENTION

Figure 1:
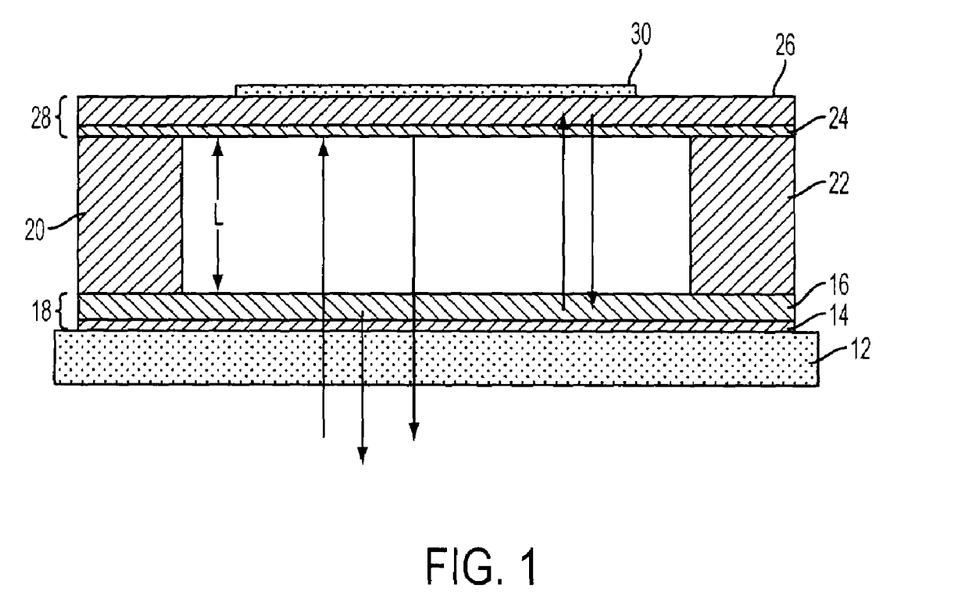
FIG. 1 illustrates a mass sensor in accordance with an embodiment of the invention.

FIG. 1 illustrates a sensor 10 in accordance with an embodiment of the invention. The sensor includes a microbeam coated with a chemoselective polymer to detect the presence of a volatile organic compound using an all-optical technique. In this example, the sensor uses a bridge design. The sensing procedure is based on detecting a shift in the resonant frequency of the microbridge induced by the absorption of chemical vapors by the chemoselective polymer.

A microbridge is fabricated on a transparent substrate 12 such as sapphire or a thin silicon wafer. The fabrication begins with an unpatterned deposition of a base layer 14 that bonds a gold layer 16 to the substrate 12. The base layer 14 can be about 3 nanometers of titanium, chrome, or nickel. The gold layer 16 is approximately 5 nanometers in thickness. The base layer 14 and the gold layer 16 form a bottom reflector 18. The bottom reflector 18 can be deposited by e-beam evaporation and is about 80% reflective at the 980 nm and 1550 nm wavelengths.

Photolithography, electroplating, and lift-off techniques are used to form gold posts 20 and 22 and a sacrificial layer of material such as polymethylglutarimide (PMGI) in the region between the posts.

A second photolithographic and lift-off step, which defines the microbridge 28 itself, is used with a second electroplating or e-beam deposition of a base layer 24 that can be, for example, 10 nm of titanium, followed by 1 micron of gold beam metal 26. The sacrificial PMGI material is etched with acetone to release the microbridge and the sample is dried in a critical point dryer. The posts 22 support the gold and titanium layers that form the microbridge 28.

Figure 2:
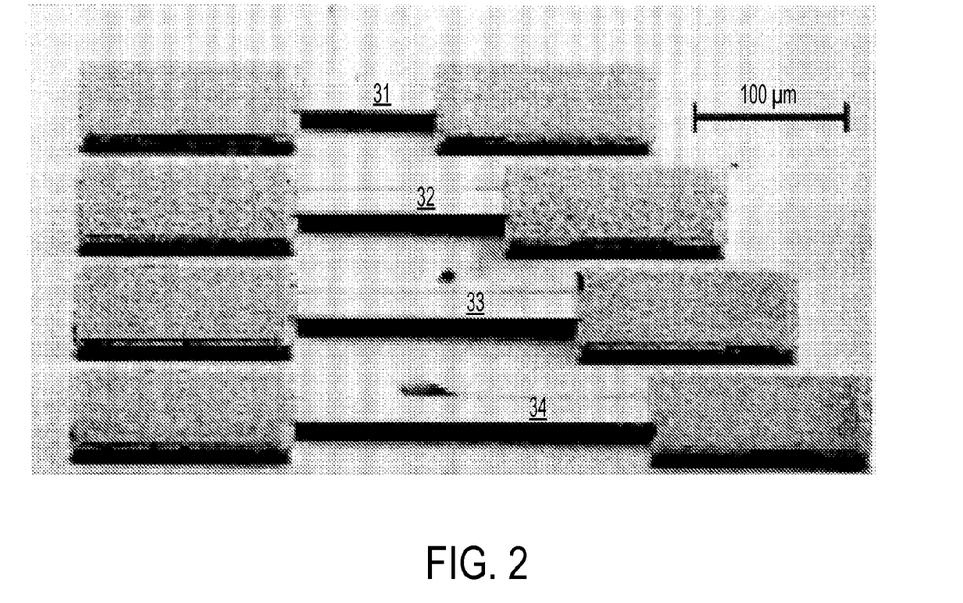
FIG. 2 illustrates mass sensors of varying sizes in accordance with embodiments of the invention.

FIG. 2 illustrates five different microbeams 31, 32, 33, 34, and 35, each having dimensions of about 1 micron thick by 40 microns wide with beam lengths varying from 100 to 500 microns. The gap between the top of the substrate and the bottom of the bridge (the cavity length L) is set by the post height, which is 10 microns in these structures. This relatively large gap minimizes the effect of squeeze-film damping, resulting in larger Q factors and, thus, smaller resolvable frequency shifts. The microbeams are coated with polyisobutylene, a polymer sensitive to hydrocarbon vapors such as toluene and hexane. The polyisobutylene is dissolved in 0.1% chloroform and deposited on the top surface of the microbeam using a 50 micron diameter ink-jet nozzle.

Referring again to FIG. 1, a chemoselective polymer layer 30 is deposited on the gold layer 24. In this example, the polymer layer 30 is polyisobutylene, although other chemoselective material layers are also suitable depending the chemical to be detected. Nonuniformities in the surface of the polymer layer on the top of the microbridge do not affect the optical properties of the cavity formed by the microbridge and the bottom reflective layer.

The reflective microbridge 28 and the bottom reflector 18 form a microcavity that exhibit etalon modes that are characterized by regularly spaced minima in the reflection spectrum. These modes arise from the interference of light reflected off the ends of the cavity. Parallel reflectors form a Fabry-Perot etalon. The wavelengths of these etalon modes depend on the length of the microcavity, and in a Fabry-Perot etalon, the wavelength of an etalon mode is $\lambda_n = 2L/(n+1)$, where $\lambda_n$ is the wavelength of the nth mode, with n=0, 1, 2, ... and L is the cavity length.

Figure 3:
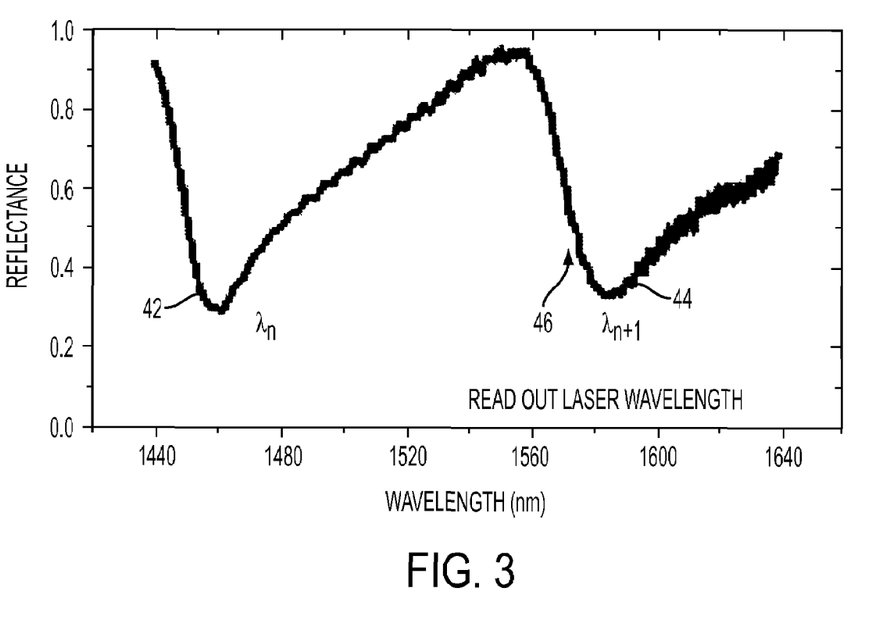
FIG. 3 is a graph illustrating microcavity interferometry modes measured from an etalon cavity formed by a gold microbridge and a reflective gold layer on a substrate in accordance with an embodiment of the invention.

FIG. 3 illustrates microcavity interferometry modes 42 and 44 measured from an etalon cavity formed by a gold microbridge and a 10 nanometer gold layer on the substrate. Movement of the microbridge changes the cavity length, which in turn changes the reflectivity from the cavity and shifts the wavelength of the etalon mode.

Two lasers, operating at two different wavelengths, are used to excite and interrogate the microcavity.

Figure 4A:
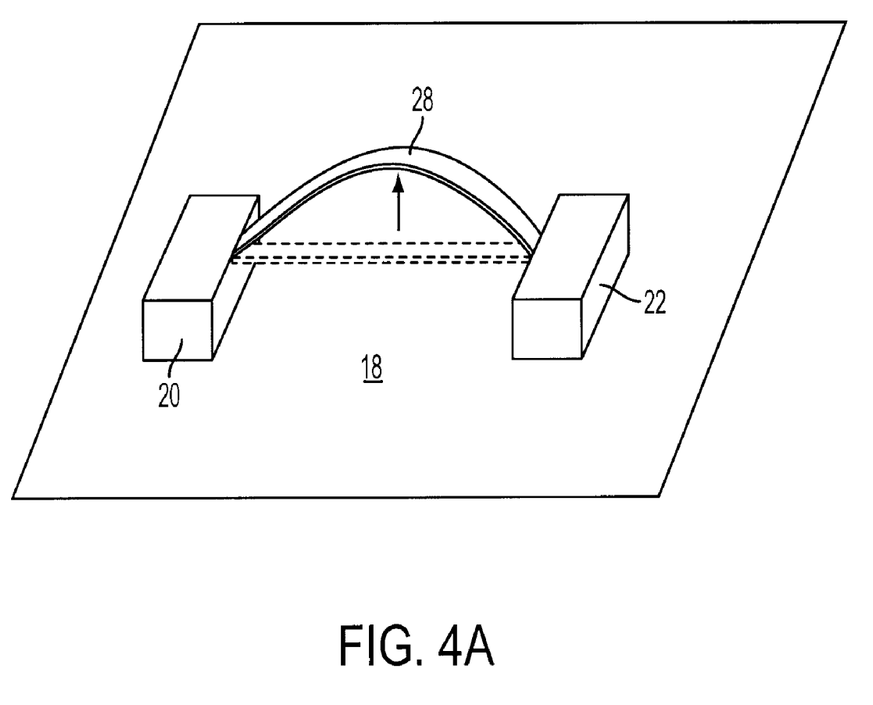
FIG. 4A illustrates expansion of the microbridge in a mass sensor in accordance with an embodiment of the invention.

A first laser (the "activation" or "excitation" laser) is an amplitude modulated laser that photothermally excites the microbridge. The laser energy heats the microbridge 28, causing it to expand and to move out of its original position as illustrated in FIG. 4A. This deflection changes the cavity length L between the top reflective layer and the bottom reflective layer.

In an exemplary embodiment, the excitation laser wavelength is amplitude modulated at a frequency near the fundamental flexural frequency of the microbeam. This modulation photothermally excites the microbeam to resonate at its fundamental frequency.

A second laser (the "readout" or "interrogation" laser) optically interrogates the microcavity formed by the top reflective layer and the bottom reflective layer, and operates at a wavelength different than that of the amplitude modulated laser excitation laser. The change in the cavity length results in a change in the amount of light reflected from the cavity. As illustrated in FIG. 3, the readout laser wavelength should not coincide with the reflectance minima of an etalon mode, and should be at a point where the slope of the reflectance versus wavelength curve is large. In FIG. 3, the readout laser wavelength is about midway between the reflection maxima at about 1560 nm and the reflection minima at about 1580 nm. The readout laser is preferably a tunable laser that can be set at the desired wavelength.

In an exemplary embodiment, the frequency of amplitude modulation is swept over a frequency range that includes the flexural frequency of the microbeam with and without sorbed chemicals in the chemoselective polymer layer. An optically detected change in the resonant frequency of the microbeam indicates a change in the mass of the microbeam.

Figure 4B:
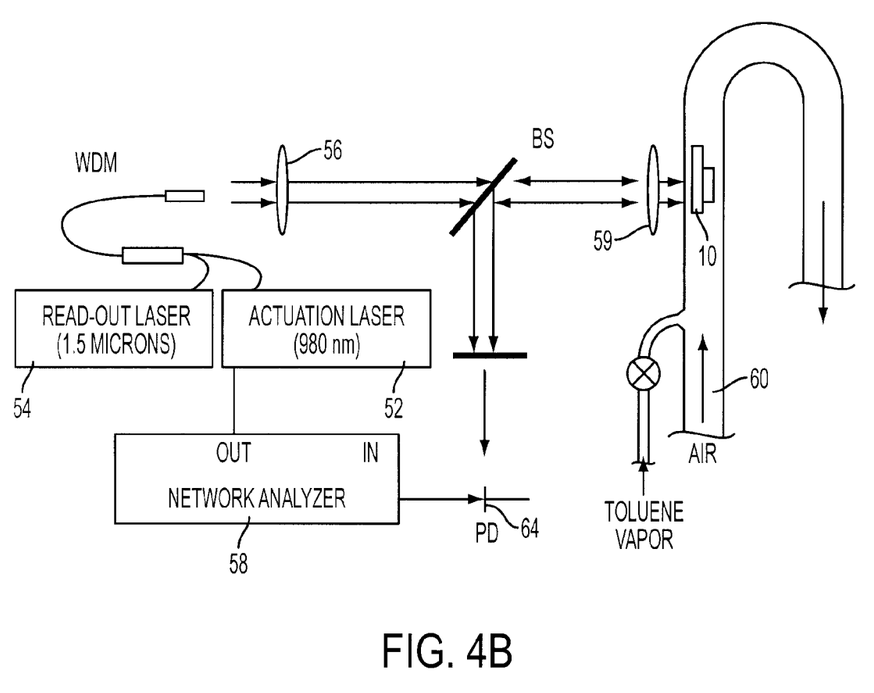
FIG. 4B demonstrates the use of mass sensors in accordance with an embodiment of the invention to detect toluene.

FIG. 4 illustrates a microbeam sensor in operation with a tunable readout laser and an amplitude modulated activation laser. To demonstrate operation of the system, sample microbridge sensors 10 are placed in an enclosed flow cell using the sapphire substrate as a window in the enclosure. The flow cell 60 has an inlet and an outlet for the flow of a dilute gas and had an ambient pressure of 1 atm. Mass flow controllers are used to set the flow through a toluene bubbler and an air flow tube. The ratio of these flow rates controls the analyte concentration at the flow cell. A valve between the bubbler and the air flow tube turns the analyte flow on and off with a time constant of 15 ms.

In this example, the interrogation laser and the actuation laser are diode lasers with powers of 1 mW. The actuation laser, at 980 nm, is amplitude modulated by the output of a network analyzer 58 at frequencies near the fundamental flexural resonance of the microbeam. The network analyzer sweeps the frequency of amplitude modulation over a range of frequencies to determine the resonant frequency of the microbeam. This modulation excites the microbeam into resonance photothermally. The interrogation laser is a tunable diode laser that operates between 1440 nm and 1640 nm and measures the vertical displacement of the microbeam using microcavity interferometry. The optical beams of the interrogation laser 54 and the excitation laser 52 are focused with a 56 through a transparent window 59. The optical beams reflect back from the microcavity formed by the thin gold and titanium metal on the substrate surface and by the microbeam of the sensor 10. The reflected beams pass through a high-pass optical filter 62 to block the light at 980 nanometers prior to detection by an InGaAs photodiode 64. The reflected light at the wavelength of the interrogation laser is sent to the network analyzer 58. The network analyzer determines the resonant frequency of the microbeam, from which a change in mass of the microbeam is identified.

Figure 5A:
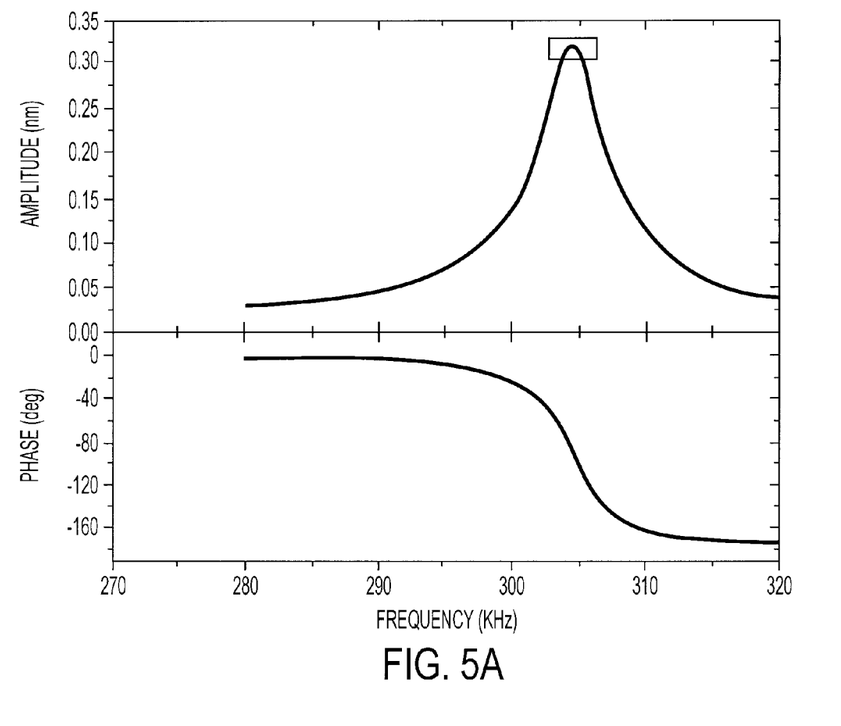
FIG. 5A illustrates the mechanical spectrum of a 100 micron long microbeam coated with polyisobutylene in accordance with an embodiment of the invention exposed to toluene with the readout laser tuned to 1572 nm.
Figure 5B:
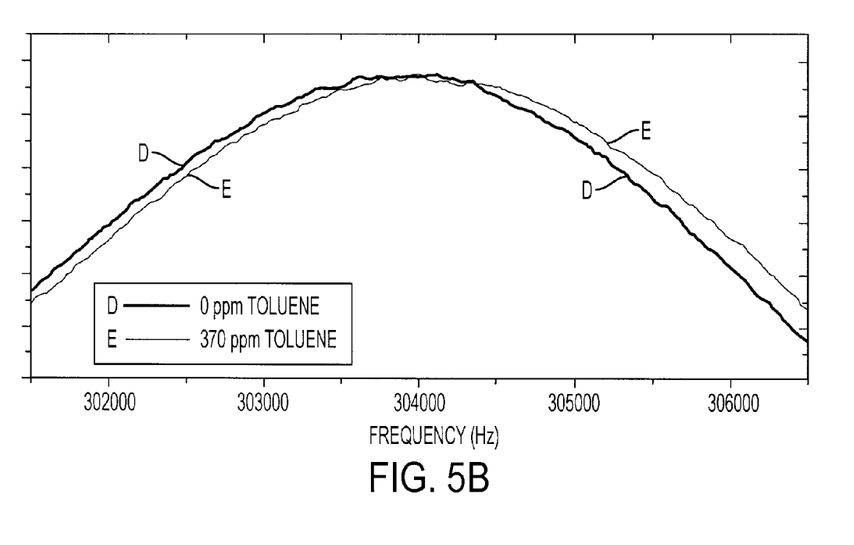
FIG. 5B is an expanded view of a portion of FIG. 5A.

The mechanical spectrum (amplitude and phase) of a 100 micron long microbeam coated with polyisobutylene exposed to toluene with the readout laser tuned to 1572 nm is shown in FIGS. 5A and 5B. Note that the displacement at resonance is 320 picometers. This sensitivity allows for the use of submilliwatt photothermal actuation powers and permits the measurement of extremely small shifts in the microbeam resonance frequency.

In this example, the mechanical spectrum of the microbeam is measured with a displacement resolution that is less than 1 pm/Hz$^{1/2}$. The resolution is set by thermal-mechanical noise and is the limiting factor in the minimum measurable frequency shift in the sensor. In this example, the on-resonance displacement noise of 70 fm/Hz$^{1/2}$ is close to the calculated thermal-mechanical noise 73 fm/Hz$^{1/2}$, suggesting that this particular micromechanical resonator is operating very close to its sensitivity limit.

The spectra in FIGS. 5A and 5B corresponds to a mechanical quality (Q) factor of 72 and was acquired in a time of 0.9 s (100 points at a resolution bandwidth of 100 Hz per point). Each mechanical spectrum yields a single measurement of the resonant frequency, so the system sampling rate is 1.1 Hz for this choice of scan parameters. Faster sampling rates can be used, but at the expense of increased amplitude noise and thus frequency resolution. The detection of a chemical vapor is carried out by continuously monitoring the resonant frequency.

Figure 6:
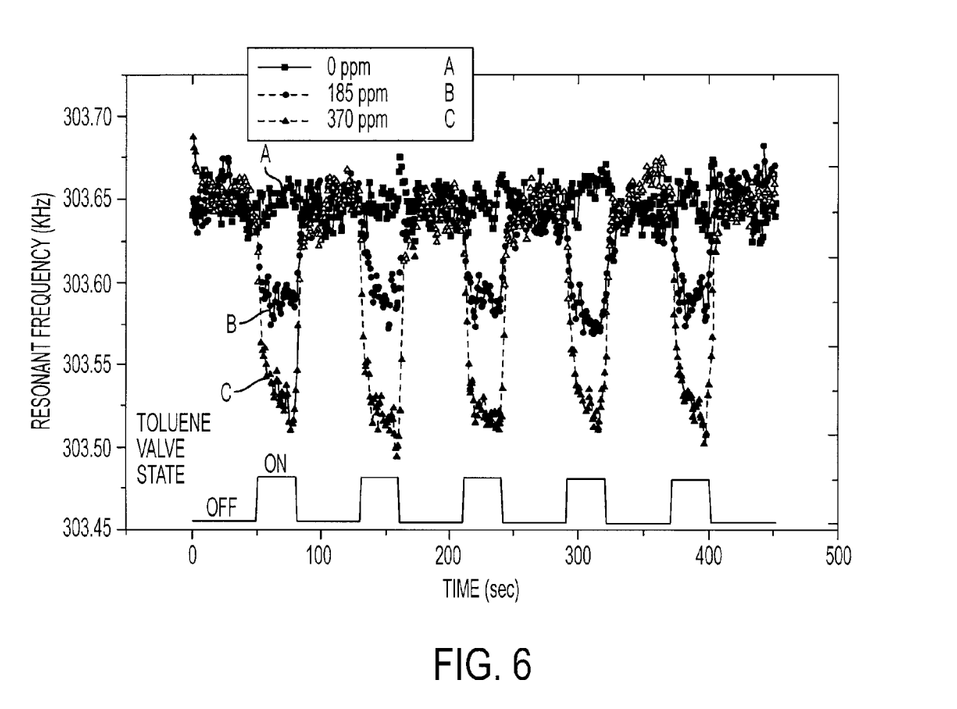
FIG. 6 shows plots of the resonant frequency versus time measured by a mass sensor according to an embodiment of the invention as the target chemical is turned on and off in a flow.

FIG. 6 shows plots of this resonant frequency versus time as a valve between the toluene bubbler and the flow cell is opened and closed. Each plot corresponds to a different concentration of toluene vapor during the time the valve is open. The 304 kHz resonant frequency shows a shift of about 120 Hz for the largest toluene flow during the time the valve is open. This shift occurs with a fall time of 3.5 s. When the toluene valve is closed, the resonant frequency recovers its initial value with a rise time of 4.3 s. The repeatability of this process demonstrates the reusability of the sensor.

The change in the mass of the resonator upon absorption of the analyte can be estimated from the frequency shift using an effective harmonic oscillator model for the microbeam. $\delta m_{eff}/m_{eff} = 2\delta f_0/f_0$, where $m_{eff}$ is related to the real beam mass m by a mode-specific geometric factor. Since the length scale of the roughness of the coating is much smaller than the length of the bridge, $\delta m_{eff}/m_{eff}$ is approximately equal to $\delta m/m$. Thus, a $\delta f/f_0$ of $9.0 \times 10^{-5}$ as indicated by FIG. 5 corresponds to a $\delta m$ of approximately $1.5 \times 10^{-15}$ kg (1.5 picogram), or about $9.5 \times 10^9$ toluene molecules.

The analyte vapor concentration can be estimated using the saturated vapor pressure of toluene and the flows through the bubbler and the air flow tube. The data in FIG. 5 for the largest toluene flow correspond to a concentration of 370 ppm (1410 mg/m$^3$) with the valve open. The noise level of about 20 Hz implies a minimum detectable vapor concentration of 60 ppm with this coating. For comparison, C. Hagleitner, D. Lange, A. Hierlemann, O. Brand, and H. Baltes, in IEEE J. Solid-State Circuits, Vol. 37, page 1867 (2002), report a minimum detectable toluene concentration of 1-5 ppm using resonating microcantilevers coated with 4 microns of polyetherurethane. In comparison, the optical system and technique described herein can result in a larger fractional frequency shift for a given vapor concentration ($1.1 \times 10^6$/ppm) than the piezoresistive sensing technique of Hagleitner et al. ($9.7 \times 10^8$/ppm).

Decreasing the minimum resolvable frequency shift in the system described herein by increasing the microbeam Q factor or by increasing the photothermal displacement amplitude can allow the system to measure toluene vapor concentrations of a few parts per million.

In other embodiments, sensitivity to environmental fluctuations is reduced with stiffer microbeams and/or the use of reference (uncoated) resonators. Reference structures adjacent to coated ones can be used to subtract unwanted environmental effects from the desired signal. The issue of chemical interferents is best addressed by using an array of microbeams, each with a different coating, with each coating responding differently to an analyte of interest, such that the overall response of the array is a signature specific to that analyte.

In addition, improvements to the opto-mechanical properties of the micromechanical resonators can also enhance the versatility and sensitivity of the sensors. Higher mechanical Q-factors and resonant frequencies coupled with thicker chemoselective coatings will increase the detection sensitivity. The specific embodiment illustrated herein discusses the detection of a volatile organic compound. However, other vapors such as explosives or toxic industrial chemicals can be detected using the same method and system, with a specific chemoselective material for the target chemical of interest.

A single optical interrogator can contain both the light source and the readout electonics. The single optical interrogator can interrogate multiple passive, coin-sized sensors at remote distances from the user of tens or hundreds of meters. Distances between the optical interrogator and the sensor can exceed 1 km by using an optical retroreflector or by placing an optical fiber between the laser source and the sensor.

In an exemplary embodiment, the sensor can be arranged in front of, or integrated into, a retroreflector, in order to ensure reflection of the interrogation laser light toward a remote module that contains both the lasers and the network analyzer.

The large distance between the optical interrogator and the sensor favorably compares with previously attempted sensor systems. For example, the system described in T. Thundat, E. A. Wachter, S. L. Sharp, and R. Warmack, Appl. Phys. Lett. 66, 1695 (1995) has non-parallel incident and output beams, so has a practical limit of a few meters on the distance between the sensor and the source/receiver.

The reflective layers of the sensor are not limited to titanium and gold, and can be formed of any material reflective at the interrogation wavelength that can be photothermally excited at the excitation wavelength.

The substrate can be any material that is sufficiently transparent to transmit the optical energy to the reflective surfaces. Preferably, the substrate should transmit a high percentage of the laser energy received.

The amplitude modulation of the excitation laser can be accomplished by using a amplitude modulated laser, or with a CW laser and a separate modulator that interrupts or reduces the amplitude of the CW laser beam.

Other embodiments of the invention are directed to methods of making and using the microbeamsensors described herein to detect a target chemical.

The invention has been described with reference to certain preferred embodiments. It will be understood, however, that the invention is not limited to the preferred embodiments discussed above, and that modification and variations are possible within the scope of the appended claims.

The invention claimed is:

1. A method for sensing a change in mass of a reflective microbeam in a sensor, the sensor having a reflective layer disposed on a substrate and spaced apart from the reflective microbeam, the method comprising:
   the microbeam receiving amplitude modulated laser energy at a first wavelength and being photothermally excited into resonance at the frequency of amplitude modulation;
   the reflective microbeam and the reflective layer receiving optical energy at a second wavelength, said reflective microbeam and reflective layer reflecting the optical energy toward a receiver; and
   interferometrically determining a change in reflectivity of the microbeam, said change in reflectivity indicating a change in resonant frequency of the microbeam due to increased mass of the microbeam resulting from sorption of a target chemical by a chemoselective material on the microbeam.

2. The method according to claim 1, wherein the microbeam is a microbridge spaced apart from the reflective layer by supports on both ends of the micro bridge.

3. The method according to claim 1, wherein the substrate is transparent at the first and second wavelengths.

4. The method according to claim 3, wherein the reflective microbeam has a reflectivity at least as high as the reflectivity of the reflective layer disposed on the microbeam.

5. The method according to claim 1, wherein the substrate comprises sapphire.

6. The method according to claim 1, comprising: an amplitude modulated laser generating optical energy at the first wavelength.

7. The method according to claim 1, wherein the frequency of amplitude modulation of the first laser is offset from the fundamental resonance frequency of the microbeam.

8. The method according to claim 1, comprising varying the frequency of amplitude modulation through a frequency range.

9. The method according to claim 8, wherein the frequency range includes the resonance frequency of the microbeam without sorbed chemical in a chemoselective layer on the microbeam and the resonance frequency of the microbeam with sorbed chemical in a chemoselective layer on the microbeam.

10. The method according to claim 1, wherein a tunable laser generates optical energy at the second wavelength.

11. The method according to claim 1, wherein the second wavelength is tuned to a side of the Fabry-Perot mode of the etalon cavity, the etalon cavity being formed by the reflective microbeam and the reflective layer disposed on the substrate.

12. The method according to claim 1, wherein a layer of chemoselective material is disposed on the microbeam.

13. The method according to claim 12, wherein the layer of chemoselective material is disposed on a surface of the microbeam opposite the surface of the microbeam that faces the substrate.

14. The method according to claim 13, wherein the chemoselective material is a chemoselective polymer.

15. The method according to claim 14, wherein the chemoselective polymer is polyisobutylene.

16. The method according to claim 12, wherein the change of resonant frequency indicates an amount of a target chemical sorbed by the chemoselective material.

17. The method according to claim 1, wherein
   said reflective microbeam includes a reflective layer and a chemoselective polymer layer,
   wherein said substrate is transparent,
   wherein said reflective layer on said transparent substrate and said reflective layer of said microbeam form two reflectors at opposite ends of a Fabry-Perot etalon.

18. The method according to claim 1, wherein said second wavelength is different than said first wavelength, said optical energy at the first wavelength is received from a first laser and said optical energy at said second wavelength received from a second laser.

19. The method according to claim 18, further comprising:
   a network analyzer sweeping the frequency of amplitude modulation over a range of frequencies, wherein said amplitude modulation photothermally excites the microbridge at its fundamental resonance frequency.

20. A mass sensor comprising:
a first reflective layer disposed on a transparent substrate;
a microbridge including reflective material;
a chemoselective material on the microbridge; and
support posts arranged at each end of the microbridge connecting ends of the microbridge to the transparent substrate to maintain the microbridge at a distance from the first reflective layer; the microbridge having a fundamental resonance frequency;
the microbridge and the first reflective layer forming a Fabry-Perot etalon cavity.

21. The mass sensor according to claim 20, wherein the substrate is sapphire.

22. The mass sensor according to claim 20, wherein the first reflective layer includes a layer of titanium and a layer of gold.

23. The mass sensor according to claim 20, wherein the microbridge comprises a layer of titanium and a layer of gold.

24. The mass sensor according to claim 20, wherein a change of resonant frequency of the microbeam indicates an amount of a target chemical sorbed by the chemoselective material.

25. The mass sensor according to claim 20, wherein the chemoselective material is a chemoselective polymer.

26. The method according to claim 20, wherein the chemoselective polymer is polyisobutylene.

27. A mass sensor system comprising:
the mass sensor according to claim 20; and
an amplitude modulated laser for photothermally exciting the microbridge at its fundamental resonance frequency.

28. The mass sensor system according to claim 27, further comprising:
a tunable laser for optically interrogating the etalon cavity.

29. The mass sensor system according to claim 27, further comprising:
a receiver operative to receive reflections from the etalon cavity.

30. The mass sensor system according to claim 27, wherein the receiver, the amplitude modulated laser, and the tunable laser are part of a common assembly remote from the mass sensor.

31. The mass sensor system according to claim 30, wherein the sensor further includes a retroreflector.

32. The mass sensor according to claim 20, wherein said support posts connect said microbridge to said first reflective layer on said transparent substrate.

33. The mass sensor according to claim 32, wherein the first reflective layer on said transparent substrate comprises a gold layer.

34. A mass sensor system comprising:
the mass sensor according to claim 20;
a first laser, the first laser being an amplitude modulated laser for photothermally exciting the microbridge at its fundamental resonance frequency; and
a second laser, the second laser being a tunable laser for optically interrogating the etalon cavity, said second laser operational to generate laser energy at a different wavelength than the first laser.

35. A mass sensor comprising:
a transparent substrate;
a first reflector disposed on the transparent substrate;
a microbridge including a second reflector and a chemoselective material,
at least two support posts arranged at both ends of the microbridge; and
said support posts connecting said microbridge to the first reflector;
the reflective material on the microbridge and the first reflective layer on the transparent substrate defining a Fabry-Perot etalon cavity and forming two reflectors of the Fabry-Perot etalon cavity.

36. The mass sensor according to claim 35,
wherein the first reflector on the transparent substrate is on a surface of the transparent substrate facing the microbridge.

* * * * *